July 14, 1925.
R. C. PATTISON
MILKING TUBE
Filed Nov. 20, 1923
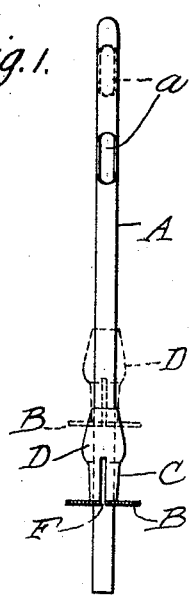
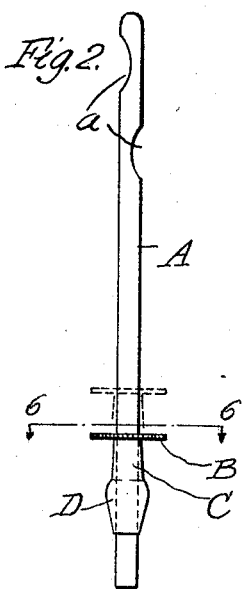
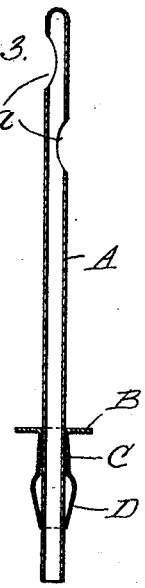
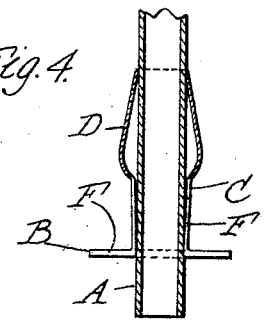
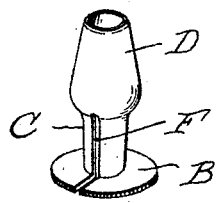
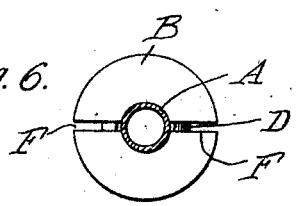

Patented July 14, 1925.

1,545,598

UNITED STATES PATENT OFFICE.

ROSCOE C. PATTISON, OF SPRINGVILLE, NEW YORK, ASSIGNOR OF ONE-HALF TO WALLING BROTHERS, INC., OF SPRINGVILLE, NEW YORK.

MILKING TUBE.

Application filed November 20, 1923. Serial No. 675,846.

*To all whom it may concern:*

Be it known that I, ROSCOE C. PATTISON, a citizen of the United States, residing at Springville, in the county of Erie and State of New York, have invented a new and useful Improvement in Milking Tubes, of which the following is a specification.

This invention relates to improvements in milking tubes of the kind commonly used for drawing off the milk from the bag of a cow or other animal.

Milking tubes of this kind as heretofore made have generally been provided with a rigid stop device for limiting the extent to which these tubes can be inserted into a teat and since tubes of different lengths must be used on different animals, it has heretofore been necessary for a dealer in milking tubes or for a manufacturer to keep in stock tubes of different lengths, or in other words, tubes on which the stops were secured at different distances from the ends of the tubes. Some of these tubes are also provided near the stop with protuberances or bulges which are used for retaining the milking tubes in place and other tubes are made without these bulges, which, in turn, necessitated the carrying in stock of two types of tubes, as well as different lengths in each type.

The objects of this invention are to provide a milking tube which is adjustable for different lengths and which has a tube-retaining bulge or protuberance which may be positioned either in an operative or in an inoperative relation to the milking tube, whereby a single milking tube may be readily adapted to be used with or without the retaining protuberance and may be adjusted as to length, whether used with or without the retaining protuberance; also to improve milking tubes of this kind in other respects hereinafter specified.

In the accompanying drawing:

Fig. 1 is an elevation of a milking tube arranged with the tube retaining device in an operative position thereon.

Fig. 2 is an elevation thereof showing the tube with the retaining device in an inoperative position thereon.

Fig. 3 is a longitudinal sectional elevation thereof with the parts in the same positions as in Fig. 2.

Fig. 4 is a fragmentary sectional elevation thereof on an enlarged scale.

Fig. 5 is a perspective view of a movable stop and tube retaining member detached from the milk withdrawing tube.

Fig. 6 is a transverse section of the tube on line 6—6, Fig. 4.

My improved milking tube includes a tubular member A of usual construction provided adjacent one end thereof with one or more holes $a$, two being shown in the construction illustrated. The upper end of the tube, as shown, is closed and the lower end is open to discharge the milk entering into the tubes through the holes $a$. The milk withdrawing tubular member A is of substantially uniform diameter throughout its length. The milking tube also includes an adjustable stop and retaining member which is slidably arranged on the tubular member A. This combined stop and retaining member may be of any suitable or desired construction and is provided with friction means for holding the stop member on the tubular member A. In the construction shown, the combined stop and retaining member is provided at one end with a radial flange B, which serves to stop or limit movement of a tube into a teat, and this stop flange is preferably formed integral with a neck portion C of reduced diameter which closely fits the exterior of the milk withdrawing tube A. This neck portion terminates in a bulb-like protuberance or bulge D which may be of usual or suitable shape and the outer end of which fits closely to the exterior of the tubular member A.

In order to frictionally hold the combined stop and retaining member in any desired position on the tubular member A, the stop flange B, as well as the neck or tubular portion C, is provided with one or more slits F, and the material of which the combined stop and retaining member is made is preferably resilient so as to cause the portions of the stop member between the slits to frictionally grip the sides of the tubular member. Any other means for yieldingly holding the combined stop and retaining member in various positions on the tubular member A may be employed.

The combined stop and retaining member can be removed from the tube and reversed, and consequently when it is desired to use the retaining protuberance D, a combined stop and retaining member is placed on the tubular member, as shown in Fig. 1, and when in this position may be adjusted toward and from the end of the tube to vary the length of tube to be inserted in a teat. If it is decided that the bulb or retaining protuberance should not be used, the combined stop and retaining member D is reversed, as shown in Fig. 2, so that the other end of the stop flange acts to limit the extent to which the tube may be inserted into a teat, the protuberance D in that case being inoperative.

By means of the construction described, milking tubes may be adjusted for different lengths, as well as used with or without the protuberance or retaining member, thus eliminating the necessity of having on hand milking tubes of the two different types to suit different conditions.

I claim as my invention:

1. A milking tube including a tubular member of substantially uniform diameter adapted to be inserted into a teat, and a part adjustable lengthwise of said tubular member and adapted to be held in different positions thereon and including a stop portion adapted to engage a teat to limit the extent to which said tubular member may be inserted into the teat, and the retaining portion connected with and spaced from said stop portion, said part being reversible end for end on said tubular member, whereby said retaining portion may be arranged in a position to engage a teat in advance of said stop portion or in a position in which said stop portion is engaged by a teat to prevent engagement of the teat with said retaining portion.

2. A milking tube including a tubular milk withdrawing member, and a part slidably mounted on said member and including a substantially tubular body portion having a bulb-like enlargement on one end thereof adapted to be inserted into a teat to retain said tube therein and a substantially radial stop flange at the other end thereof, the end of said tubular portion adjacent said flange being slitted lengthwise thereof to enable said end to yieldingly grip said tubular member to hold said slidable part in different positions thereon, said slidable part being reversible end for end to place said bulb-like enlargement into or out of operative relation to the teat.

3. A milking tube including a tubular milk withdrawing member of substantially uniform diameter throughout its length, and adapted to be inserted into a teat, a stop part slidably arranged on said member and including a bulb-like enlargement at one end thereof adapted to be inserted into a teat to retain said tubular member therein, a substantially radial stop flange at the other end thereof and a neck portion of reduced diameter connecting said flange and enlargement, said neck portion and flange being slitted lengthwise and being adapted to frictionally grip said tubular member so that said stop part may be frictionally held in any desired position on said tubular member, said stop part being reversible end for end on said tubular member, to enable said enlargement to be arranged in a position to engage a teat in advance of said stop flange or in a position in which said stop portion is engaged by a teat to prevent engagement of the teat with said enlargement.

ROSCOE C. PATTISON.